Jan. 31, 1967  M. GOLDBERG  3,301,501

AUTOMATIC THREADING FILM REEL

Filed June 3, 1965

INVENTOR.
MORRIS GOLDBERG
BY
ATTORNEYS

United States Patent Office 3,301,501
Patented Jan. 31, 1967

1

3,301,501
AUTOMATIC THREADING FILM REEL
Morris Goldberg, Denver, Colo., assignor to Goldberg Brothers, Inc., Denver, Colo., a corporation of Colorado
Filed June 3, 1965, Ser. No. 460,943
8 Claims. (Cl. 242—74)

This invention relates to film storage reels and, more specifically, to reels of the self-threading type for movie film.

For many years now, the only moving picture film reels available were those with the hollow slotted hub into which the end of a leader was threaded and kept in place frictionally by rotating the reel by hand a turn or two until one or more layers of the leader covered the slot. This type of film reel, while still in wide-spread use, is difficult and time-consuming to thread, especially for persons who do so infrequently as is often the case with the home movie-maker.

Generally speaking, the prior art attempts to provide self-threading movie film reels have met with only limited success and public acceptance. There are several reasons for this, two of which outweigh the others in importance.

The first of these is that many of the existing self-threading movie film reels do not perform the function for which they were designed, namely, to catch and fasten the end of the leader or film to the reel hub in a simple and expeditious manner. While all of them are somewhat effective in accomplishing this desirable end result, a reel that works as intended only part of the time can become more of a nuisance than the ordinary slotted-hub heels.

The second and equally troublesome problem inherent in many self-threading reel designs is their propensity to damage the film. For practical reasons, self-threading reels find their widest market among amateur photographers using 8 mm. movie equipment. Perhaps this is because the 16 mm., 35 mm., and 70 mm. photographers are professionals or at least very advanced amateurs who find little need for such refinements due to their experience; whereas, the 8 mm. user is oftentimes a housewife or vacationer who exposes a half-dozen rolls of film a year and, because of their lack of familiarity with the equipment, need all the help they can get in performing the simple mechanical operations.

It is, indeed, unfortunate that many of the existing self-threading reels are so designed that they tear the film between sprocket holes, especially in the hands of an inexperienced operator who is the very person most likely to be using same. Once the film is damaged in this manner it becomes practically impossible to repair and the only solution is to cut out the damage portion and splice the undamaged ends together. Of course, if a leader is used on the film, it can be replaced without losing any of the pictures but, nevertheless, this is a time-consuming and bothersome procedure that can be avoided if the reel functioned properly in the first place.

Other shortcomings found in the prior art self-threading reels are their complexity, expense and difficulties arising in attempting to learn how to use them. With regard to the latter problem, the techniques that must be employed in using the self-threader are, frequently, more complicated than the manual-threading operation they are designed to improve upon.

It has now been found in accordance with the teaching of the instant invention that these and other difficulties can be eliminated through the use of a short length of spring wire bent into a semi-circular shape for insertion inside the reel hubs. Opposite ends of the wire are bent transversely to provide a lateral section extending approximately from the center of the reel hub to the flange lying nearest the sprocket holes in the film. At this point,

2 radially-outturned tips emerge onto the exterior surface of the hub through openings provided for this purpose and at a point aligned with the row of sprocket holes. These tip ends catch in the sprocket holes of the film quite readily and start the film winding onto the reel.

It is, therefore, the principal object of the present invention to provide a novel and improved self-threading reel for motion picture film.

A second object is the provision of a device of the type aforementioned that will not fail to engage and pick-up the film or leader end when placed against the hub with the sprocket holes located on the proper side.

Another object of the invention is to provide a self-threading film storage reel that includes a spring wire pick-up which will yield to release the film end before sufficient film tension is developed to tear out the sprocket holes.

Still another object of the invention is to provide a self-threading device that will automatically release the film as it is wound back off the take-up reel and onto the supply reel.

An additional objective of the invention herein disclosed and claimed is the provision of a self-threading movie film storage or supply reel that leaves the slotted hub intact for those who prefer the manual threading technique.

Further objects are to provide a self-threading film reel that is easy to use, quite inexpensive, rugged, versatile, simple to manufacture, compact, lightweight, uncomplicated and decorative in appearance.

Other objects will be in part apparent and in part pointed out specifically hereinafter in connection with the description of the drawings that follows, and in which.

Figure 1:
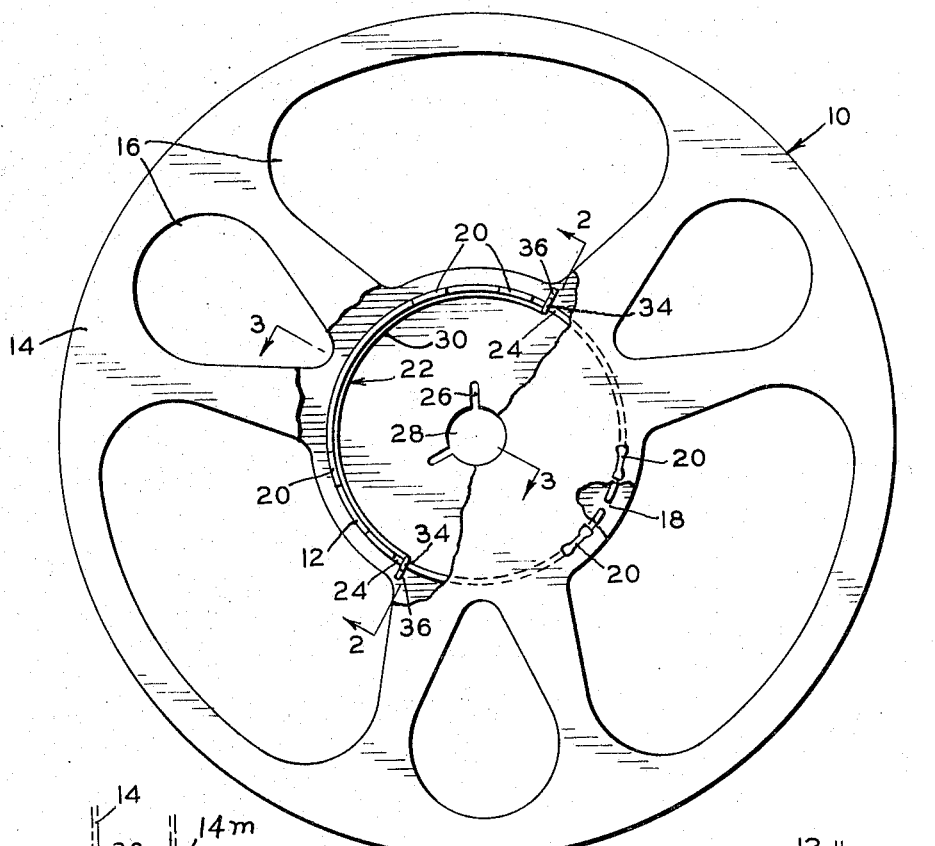
FIGURE 1 is a side elevation of the film reel with portions of the near flange broken away to expose the hub and self-threading pick-up.

Referring now to the drawings for a detailed description of the present invention and, initially, to FIGURE 1 for this purpose, reference numeral 10 has been used to designate the reel in its entirety which will be seen to include a hollow cylindrical hub 12 to the side edges of which are fastened a pair of slightly different disk-shaped flanges 14 and 14m which occupy a fixed spaced relation to one another and retain the coils of film (not shown) therebetween. The flanges 14 and 14m are conventional and merely comprise circular metal disks having a plurality of openings 16 arranged in a decorative pattern around the central hub 12. These openings serve two significant functions namely, to lighten the reel and to provide access to the hub, in case the user wishes to employ the conventional manual film-threading technique by which the film end is inserted through slot 18 in the hub 12.

The hub 12 takes the form of a split ring having tabs 20 projecting from the side edges thereof at intervals corresponding to apertures (not specifically identified) in the flanges that receive same prior to their being crimped to fasten said flanges thereto. The ends of the ring that forms the hub are left spaced-apart slightly to define the film slot 18 used for manual threading although these ends may, if desired, be butted together eliminating said slot thus leaving only the self-threading mechanism which will be described presently. For practical reasons, it is preferable to leave the slot in the hub open because the self-threading pick-up, which has been generally referred to by reference numeral 22, is difficult to see for someone unfamiliar with its presence and they could well end up unable to attach the film if provision were not made for manual threading.

The features of the hub 12 which require specific mention are the two notches 24 provided in the side edge thereof lying adjacent to the flange 14 which will be closest to the edge of the film containing the row of sprocket holes. These notches 24 are cut deep enough to open onto the exterior surface of the hub spaced inwardly of the flange 14. For convenience of manufacture, the hub is made symmetrical with the notches 24 and tabs 20 provided on both side edges even though only one set of notches 24 will be used when the reel is assembled with the pick-up 22 in place. Obviously, therefore, it becomes immaterial which side of the hub the flanges 14 and 14m are fastened onto.

At this point the difference between flanges 14 and 14m should, perhaps, be explained. The spindle of a motion picture projector upon which these film reels are mounted includes at least one, and sometimes more, radial webs that form keys which fit into registering slots 26 that border the spindle-opening 28 in the center of one of the flanges 14m. This is necessary in order to provide a driving connection between the projector spindle and reel, both of which must be powered to take-on or pay-out film at the proper rate. Now, in an ordinary manually-threaded reel, no harm would be done by providing key-slots 26 in both flanges so that either face of the reel could be placed nearest the projector. With a self-threading reel, on the other hand, this is not the case when the reel is to be used with 8 mm. film which has sprocket holes only on one side. The reason for this is that a self-threading 8 mm. film reel with key-slots in both flanges would also have to have a duplicate sprocket-hole-engaging pick-up mechanism 22 on both sides and one of these pick-ups would engage the film along the edge thereof that had no sprocket holes and likely puncture, scratch, tear or otherwise damage its surface. While the particular spring-wire pick-up 22 of the present invention would probably just be depressed into recessed relation inside the hub by virtue of the film pressing thereagainst and not cause any trouble, it is still an unnecessary duplication, the need for which can be avoided by simply eliminating the key-slots from flange 14 so that the reel will only fit onto the spindle one way.

Before leaving this point entirely, it is worthwhile mentioning that reels for use with 16 mm. and wider films that have sprocket holes along both sides could, in fact, be made entirely symmetrical so as to include pick-ups 22 for each set of holes and key-slots in both flanges to accept the projector spindle. In fact, such a reel would have certain advantages in terms of a more positive film pick-up and a division of the load tending to tear out the sprocket holes between the two pick-up bails.

It so happens that 8 mm. movie film can only be threaded through the projector one way due to the location of the teeth on only one side of the drive sprockets. When this is done, the emulsion-side of the film will face the projector lens the same way it did the camera lens while being exposed. The film will arrive at the take-up spool emulsion-side down on the top of the hub with the sprocket holes on the right as viewed from behind the projector. Thus, with the key-slotted flange 14m on the projector spindle, the sprocket holes in the film will be on the opposite side of the hub adjacent the plain flange 14. It is adjacent the latter flange that the pick-up bail 22 must emerge onto the surface of the hub through notches 26.

Next, with reference to all three figures of the drawing, the pick-up bail 22 will be seen to comprise a short length of spring wire having its center portion 30 bent into a semi-circular shape to conform to the inside radius of the hub 12. In actual practice, this center portion is preformed in an arc of less than 180° about a longer radius and, therefore, is slightly pre-loaded when placed on the semi-circular arc of FIGURE 1 inside the reel hub. When this is done, the bail is biased tightly against the hub.

This arcuate center portion 30 of the bail is preferably positioned near the center of the hub and on the opposite side thereof from slot 18 so as not to interfere with manual insertion of the film end. Otherwise, of course, the bail would block this slot and make it difficult to insert the film end. If, on the other hand, the spring bail intersects the slot and a relatively stiff leader is used on the end of the film which can be forced between the spring and hub, said spring would have the advantage of holding the leader in place and facilitate threading.

Figure 2:
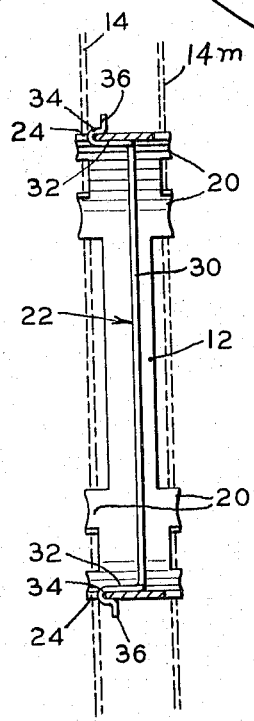
FIGURE 2 is a fragmentary section to an enlarged scale taken along line 2—2 of FIGURE 1.
Figure 3:
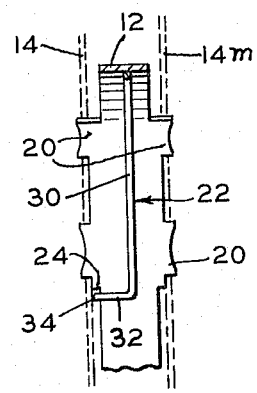
FIGURE 3 is another enlarged fragmentary section similar to FIGURE 2 but taken normal thereto along line 3—3 of FIGURE 1.

The ends of the central arcuate section 30 of the bail terminate alongside the notches 24 in the edges of the hub which, in the particular form shown, are arranged diametrically. At this point, the bail is bent to provide a diametrically-located pair of substantially parallel lateral portions 32 that extend from the ends of the center portion 30 outwardly to the notches 24. Next, the free ends of the lateral portions are provided with reversely bent portions 34 that form hooks adapted to clip over the edges of the hub that border notches 24 as shown most clearly in FIGURE 2. Finally, the free ends of the hooks 34 which are on the exterior surface of hub 12 after emerging through the notches 24, are bent into radially-extending tooth-forming portions 36 located on the hub in aligned relation with the row of sprocket holes in the film and adapted to enter same.

The manner of use of the pick-up bail 22 comprises simply laying the end of the film or leader against the hub and turning the reel in the direction that the film will ultimately be wound thereon until one of the teeth 36 catches in a sprocket hole and starts the film winding. The reel can either be turned by starting up the projector motor which will rotate the spindle mounting the reel and pick-up the film or, if desired, the reel can be given a spin by hand until the film engages. Now, the circumferential distance between the teeth has been selected such that both of them will enter a sprocket hole, the spacing between the latter being standard. The length of these teeth in relation to the thickness of the film or leader material is such that so little of the tooth projects through the first layer of film that it will not damage the second layer regardless of whether it enters a sprocket hole or not.

Having thus described the several useful and novel features of the self-threading film reel of the present invention, it will be seen that the many worthwhile objectives for which it was designed have been achieved. Although but a single specific embodiment of the invention has been illustrated, I realize that certain changes therein may well occur to those skilled in the art within the broad teaching hereof; hence, it is my intention that the scope of protection afforded hereby shall be limited only insofar as said limitations are expressly set forth in the appended claims.

What is claimed is:

1. A self-threading reel for motion picture film of the type having a row of sprocket holes extending along at least one side thereof which comprises: a hollow circular hub of a width corresponding to the width of the film to be wound thereon, said hub having at least one notch in the side thereof adjacent the edge of the film having the sprocket holes; a pair of disk-shaped flanges fastened to opposite edges of the hub to form a continuous annular radially-extending slot therebetween of a width designed to receive and retain the coils of film wound upon the hub, said flanges including centrally-located transversely-aligned openings sized to receive the drive spindle of a motion picture projector, and said flange fastened to the edge of the hub opposite the notched edge having the central opening therein shaped to cooperate with the projector spindle and form a driving connection therebetween; and, a pick-up bail carried by the hub for releasably engaging an end of the film to start same winding on the reel, said bail comprising a length of spring metal bent to include an arcuate section curved to fit the interior of the hub when placed inside thereof and a radially-extending portion formed on one end of said arcuate section positioned to emerge onto the exterior surface of said hub through the notch in its edge, said radially-extending portion forming a tooth located to enter one of the sprocket holes in a section of film laid against the hub when the reel is rotated relative to said film.

2. The self-threading film reel as set forth in claim 1 in which: at least two angularly-spaced notches are provided in the edge of the hub; the arcuate portion of the bail extends between said two notches; and, a radially-projecting tooth is formed on both ends of the arcuate portion emerging onto the surface of the hub through the two notches spanned by said arcuate portion.

3. The self-threading film reel as set forth in claim 1 in which: the arcuate portion of the bail is positioned intermediate the side edges of the hub; and, said bail includes a laterally-extending reversely-bent portion interconnecting the radial portion and the arcuate portion, said reversely-bent portion forming a hook adapted to grip the edge of the hub bordering the notch therein.

4. The self-threading film reel as set forth in claim 1 in which: the central portion of the bail is pre-loaded in a direction to bias same into contact with the interior surface of the hub.

5. The self-threading film reel as set forth in claim 1 in which: the hub comprises a split ring whose ends are spaced apart to define a film-receiving slot therebetween, said slot opening onto the interior of the hub at a point angularly displaced from the bail.

6. The self-threading film reel as set forth in claim 2 in which: the notches in the edge of the hub are located diametrically opposite one another; and, the arcuate portion of the bail is semi-circular.

7. The self-threading film reel as set forth in claim 6 in which: the arcuate portion of the bail is positioned intermediate the side edges of the hub; and, said bail includes a laterally-extending reversely-bent portion interconnecting the radial portion and the arcuate portion, said reversely-bent portion forming a hook adapted to grip the edge of the hub bordering the notch therein.

8. The self-threading film reel as set forth in claim 6 in which: the circumferential distance measured around the hub between the radially-projecting teeth is selected such that each tooth will enter a sprocket hole in the film wound onto said hub.

References Cited by the Examiner
UNITED STATES PATENTS

| | | | |
|---|---|---|---|
| 1,799,748 | 4/1931 | Hayden | 242—74 |
| 2,191,489 | 2/1940 | McQuiston | 242—74 |

FRANK J. COHEN, *Primary Examiner.*

N. L. MINTZ, *Assistant Examiner.*